Dec. 9, 1930.  A. TEWES  1,784,397
BREAD SLICING MACHINE
Filed April 22, 1929  3 Sheets-Sheet 1
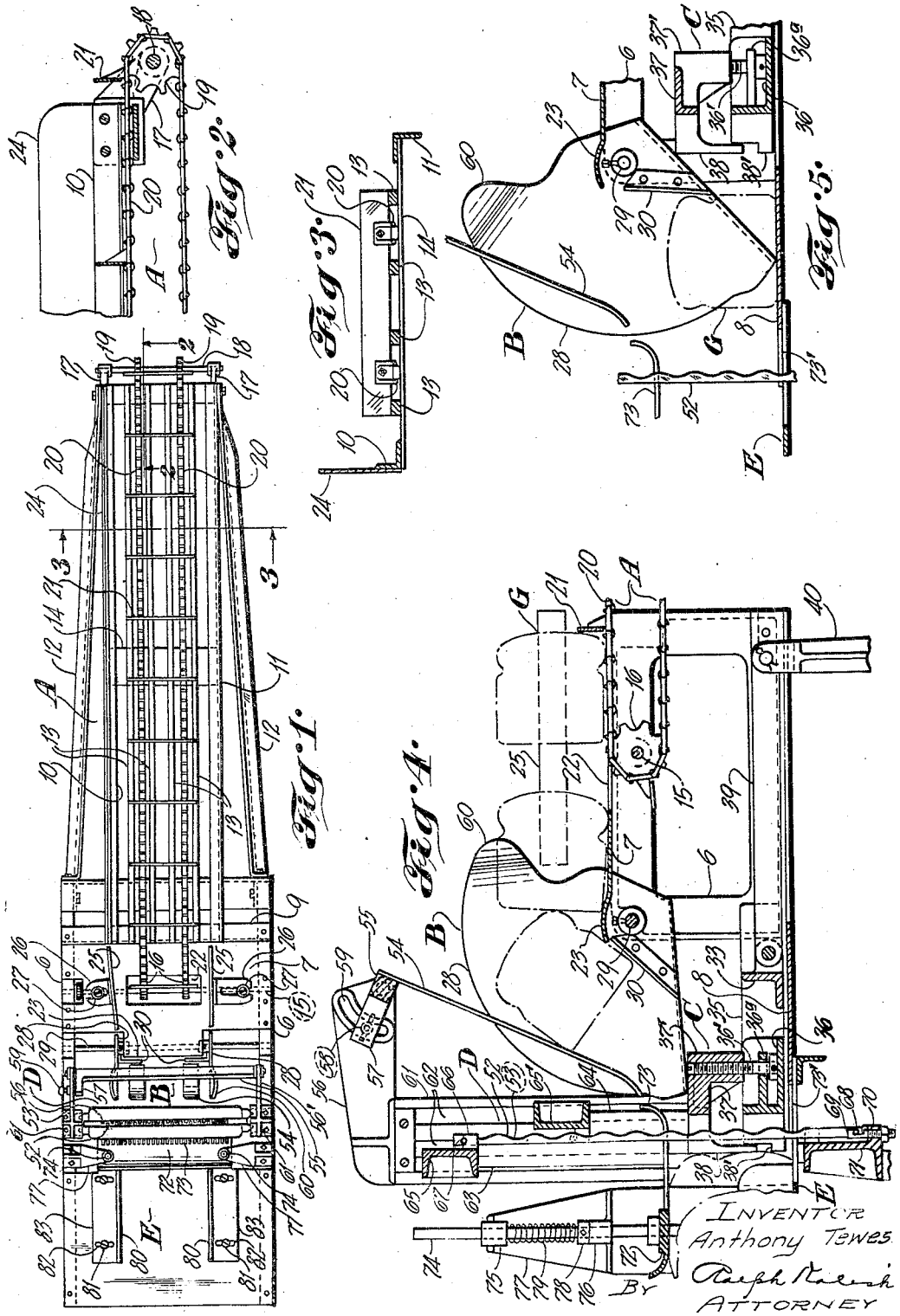

Dec. 9, 1930.   A. TEWES   1,784,397
BREAD SLICING MACHINE
Filed April 22, 1929   3 Sheets-Sheet 2
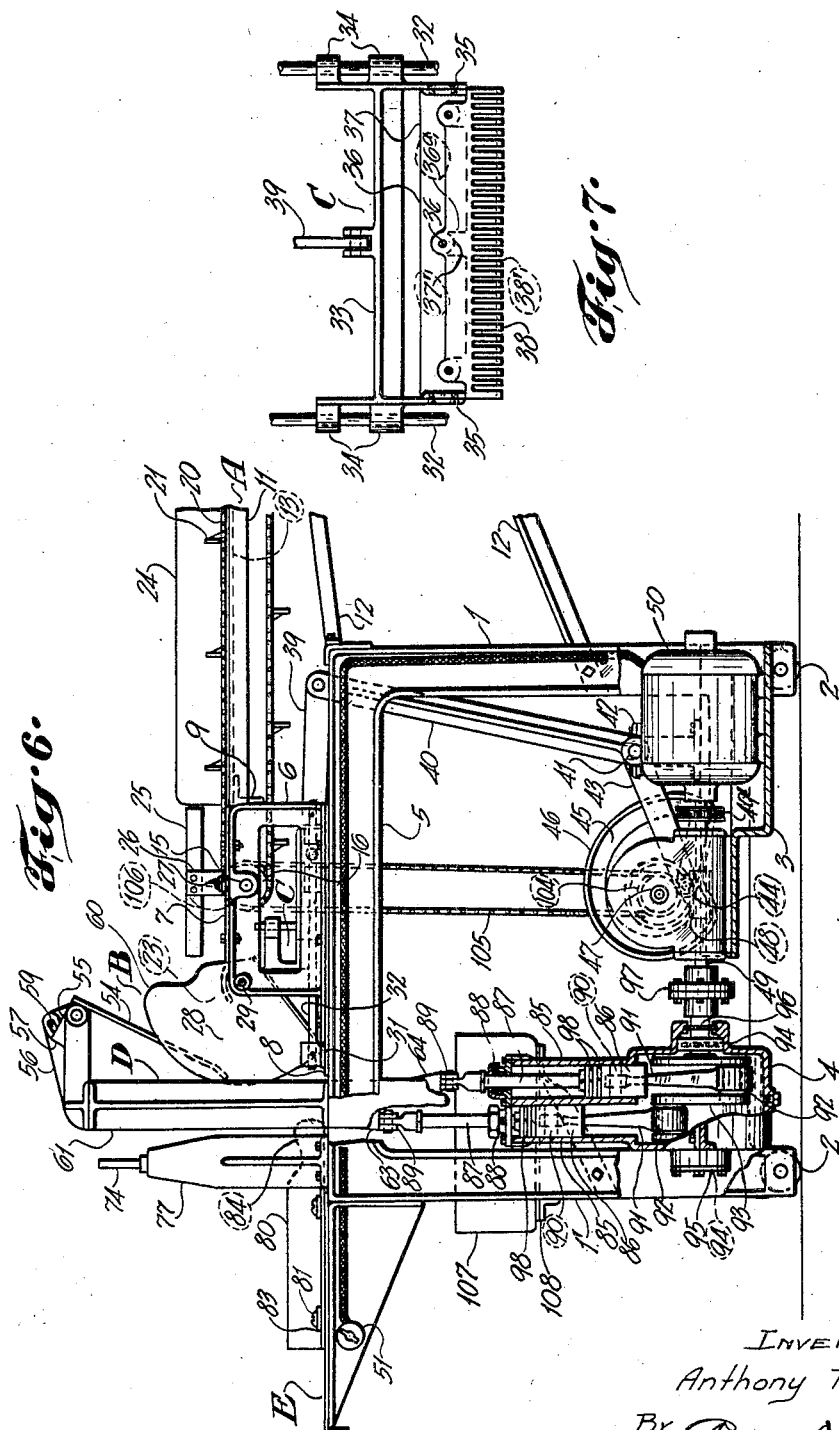
INVENTOR
Anthony Tewes.
By [signature]
ATTORNEY

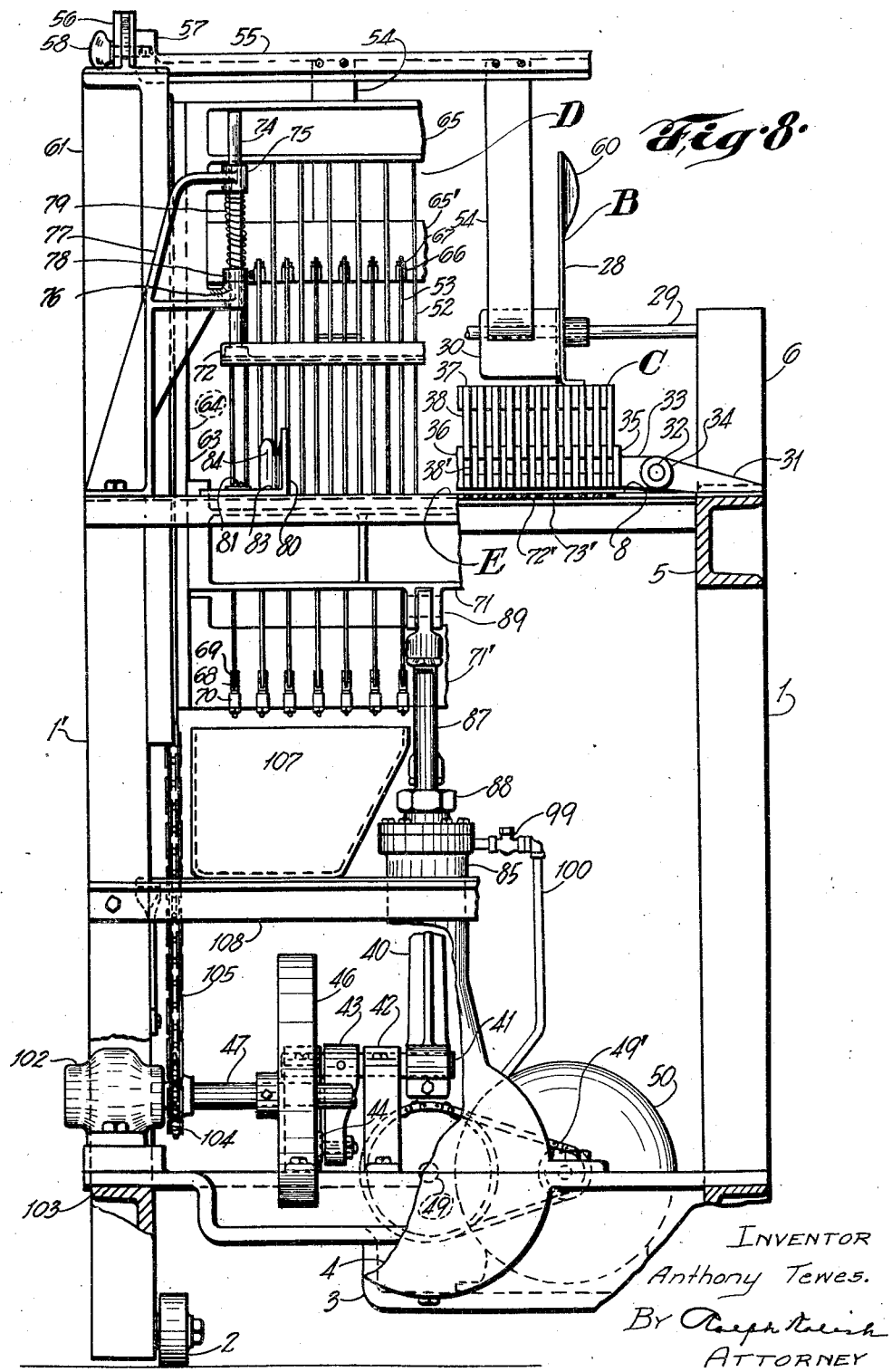

Patented Dec. 9, 1930

1,784,397

UNITED STATES PATENT OFFICE

ANTHONY TEWES, OF ST. LOUIS, MISSOURI, ASSIGNOR TO PAPENDICK, INC., OF ST. LOUIS, MISSOURI, A CORPORATION OF MISSOURI

BREAD-SLICING MACHINE

Application filed April 22, 1929. Serial No. 357,279.

This invention relates generally to slicing machines and, more particularly, to certain new and useful improvements in machines especially adapted for the slicing of bread-loaves.

My invention has for its objects the provision of a machine for the purpose stated which is of compact, durable construction, which is conveniently shiftable as a unit in and about the bakery plant, which is adapted and designed to take the loaf in whole condition and automatically deliver the same in neatly and uniformly sliced condition, ready for wrapping and shipping, which is clean and sanitary, and which is efficient and economical in use and operation.

And with the above and other objects and advantages in view, my invention resides in the novel features of form, construction, arrangement, and combination of parts hereinafter described and pointed out in the claims.

In the accompanying drawings,—

Figure 1 is a plan view of a bread-slicing machine embodying my invention;

Figure 2 is an enlarged fragmentary longitudinal sectional view of the loaf-conveyer taken approximately along the line 2—2, Figure 1;

Figure 3 is a sectional view approximately along the line 3—3, Figure 1;

Figure 4 is an enlarged fragmentary sectional view of the slicing and feeding mechanism of the machine, some of the parts coacting therewith being shown and other such parts omitted;

Figure 5 is a fragmentary view of a portion of the slicing and feeding mechanism, showing the loaf-discharging position of the oscillatory feeding-chute;

Figure 6 is a fragmentary side elevational view of the machine, the front or receiving-end of the loaf-conveyer being omitted;

Figure 7 is a detail plan view of the reciprocatory feeding-plunger, some of the coacting parts being shown and others omitted; and Figure 8 is an enlarged rear elevational view of the machine, portions thereof being broken away.

Referring now more in detail and by reference characters to the drawings, which illustrate a preferred embodiment of my invention, the machine, briefly described, includes an endless loaf carrier or conveyer A disposed at the front of the machine and preferably of such dimensions for the reception thereupon of a plurality of loaves of bread, in order that all the loaves in a bread-tray may be accommodated at one time; an oscillatory feeding-chute B for transferring and depositing the loaves of bread in sequence or successively from the conveyer A into the path of a plunger or follower C adapted for reciprocation in a horizontal plane therebelow; slicing means D, through which the successively deposited loaves of bread are transversely fed by the plunger C; and a delivery-table E disposed at the rear of the machine, on which the sliced loaves may rest while suitable containers (not shown) are placed thereover, all as will more particularly appear as the description proceeds.

The main frame of the machine, as best seen in Figure 6, preferably comprises two inverted rectangular structurally united U-shaped members or standards whose depending legs 1, 1', are each rollably or shiftably supported from the floor on casters 2, 2, the respective front legs 1 being connected near their lower ends by a suitable transverse oil-pan 3; and the rear legs 1' being united in like manner by a casing 4 housing the knife operating mechanism, presently described. Intermediately superposed on each of the horizontal members 5 of the frame-members, is a supplementary frame 6, the pair of frame members 6 supporting an elevated discharge plate 7, soon more particularly described, for the conveyer A. Disposed in a plane below, and to the rear of, the discharge-plate 7, is a feeding-table 8, on which the bread is deposited by the feeding chute B, as presently appearing, Figures 4 and 5. It may be here stated, however, that the feeding-table 8 is on a level with, and oppositely across the slicing mechanism D from, the delivery table E, and further that the plunger C plays across the feeding-table 8 between the members 6, towards and away from the slicing-knives during the operation of the machine.

Having their rear ends suitably secured to a cross-member 9 structurally uniting the supplementary frame members 6 in front of the conveyer discharge-plate 7, is a pair of laterally spaced horizontally disposed and forwardly extending conveyer frame-members 10, 11, preferably of angle cross-section, of which one member, as 10, has its stem turned upwardly and the other member, as 11, has its stem turned downwardly, for a purpose soon to appear.

The front ends of the conveyer frame members 10, 11, are, respectively, supported by suitable bracket or brace members 12 attached to the front legs 1, 1, of the main frame of the machine, as best seen in Figure 1.

Disposed between, and spaced in parallelism from, the frame members 10, 11, is a double pair of conveyer rails or slide-ways 13, which suitably rest on the cross-member 9 and also on transverse members or cross-pieces 14 supported from the frame-members 10, 11, the upper surfaces of the rails 13 being flush with the conveyer-discharge plate 7.

Suitably journaled in the supplementary frame members 6 and transversely extending therebetween, is a head shaft 15, carrying a pair of axially spaced head sprocket-wheels 16, 16. At the front end of the conveyer frame-members 10, 11, are forwardly projected bearing brackets 17, 17, in which is suitably journaled a tail-shaft 18 carrying a pair of axially spaced tail sprockets 19, 19. Stretched over the respective head and tail sprockets 16, 19, is a pair of endless carrier or conveyer strands 20, 20, having their upper runs movable between the respective pairs of rail members 13. Carried by the strands 20, 20, is a plurality of longitudinally spaced upstanding conveyer-flights 21 adapted to slide on the rail-members 13 for a portion of their travel and subsequently to slide on the conveyer discharge-plate 7, the chain strands 20 and their carried flights 21 passing through a suitable aperture 22 in the plate 7 as they pass over the head-sprockets 16 for return movement to the tail sprockets 19.

The loaves of bread, as G, to be sliced are placed between successive pairs of flights 21, which act as means for discharging the loaves from the conveyer A onto the discharge-plate 7, successive loaves of bread G resting on the plate 7 as the conveyer A and its carried flights 21 pass below the plate 7 through the aperture 22, as will be clearly seen in Figure 4, the plate 7 being provided with a rising rear margin 23 for temporarily halting the movement of the loaves thereacross.

An upstanding stop-plate 24 is mounted on the conveyer-frame-member 10, on one side of the conveyer A, the other side of the conveyer being the loading side, from which latter side the loaves of bread G are slid across the rails 13 between the flights 21 until the several loaves come against the stop-plate 24, whereby the corresponding ends of the successive loaves of bread are suitably aligned along the conveyer A. As the loaves G are discharged from the conveyer A upon the discharge-plate 7, they engage upstanding side walls 25 adjustably mounted on the plate 7, as by slotted foot-lugs 26 tied-down to the plate 7 by screws 27 threaded thereinto. The side walls 25 form an entrance throat to guidingly position the successive loaves G at the rear margin of the plate 7 in suitable alignment with the feeding-chute B, into which each loaf is pushed by the next succeeding loaf of bread as discharged from the conveyer A onto the plate 7.

The feeding-chute B is shown in Figure 1 in plan, in Figure 5 in sectional elevation in its up-ended or loaf feeding or discharging position; and in Figure 4 in sectional elevation in its loaf-receiving position. The chute B preferably comprises a pair of laterally spaced walls 28, 28, each mounted at its forward lower corner on a pivot-rod 29 supported by and between the auxiliary frame members 6, 6, at the upper rear corner thereof. Each wall 28 carries an angle member 30, whose outstanding leg is turned inwardly of the chute, the opposing outstanding legs being transversely aligned for forming a discontinuous floor for the chute, the whole forming a transverse pocket in which a loaf of bread may rest during the loading pause in the oscillation of the chute (Figure 4), the front and rear ends of the pocket being normally open for the respective reception and discharge of the load, in a manner soon to appear.

The chute B oscillatorily partially rotates, by means presently appearing, from one or its loaf-receptive position, when the angle members 30 are in an inclined position relatively to the conveyer discharge plate 7 and the feed-plate 8, as shown in Figure 4, to the other or its loaf-feeding position, when the angle members 30 are disposed approximately vertically or right-angularly to the said plates 7 and 8, as shown in Figure 5. While the chute B may be thus oscillated by any convenient means, I prefer to employ for such purpose the reciprocatory movement of the feeding-plunger C, now to be described.

Supported by and extending between transverse members 31 (Figure 8) resting on the horizontal members 5 of the main frame of the machine, and spaced in lateral parallelism in part between and in part to the rear of the frame 6, is a pair of preferably rod-like ways 32, on which is reciprocably mounted the plunger C, the latter comprising a plunger-frame 33 having aligned lugs or shoes 34 slidably engaging the ways 32, and a pair of rearwardly extending laterally spaced arms 35 between which is mounted a transverse shelf-like member 36 supporting a feeding-comb 37, whose rearwardly presented feeding fingers 38 preferably correspond in number and position to the intended number of slices into which the loaf of bread is to be cut.

I prefer to construct the feeding comb in the form of a plate having a plurality of depending posts 37′, threaded to screws 36′, whose lower ends rest on the member 36 and are rotatably secured thereto by suitable fastening lugs 36a. The fingers 38 are preferably formed integrally with the member 37 and their free rear ends are each provided with a depending portion for adjustably overlapping and registering with other fingers 38′ presented from the member 36 (Figure 4) and having functions similar to the function of the fingers 38, as soon to appear. The fingers 38 may be spaced from the fingers 38′ by manipulation of the screws 36′ suitably to the size of the bread-loaf.

A link 39 has its rear end pivoted intermediately the front side of the plunger frame 33 and its other end pivoted to one end of a lever 40, the latter being swingable for reciprocating the plunger C on the ways 32. The lever 40 at its other end is connected to one end of an oscillatory shaft 41 journaled in suitable bearing brackets 42 mounted on the transverse member or pan 3 of the main frame of the machine.

Also connected to the shaft 41, is an arm 43 carrying at its free end a roller 44 working in a cam-groove 45 in a face-cam 46 mounted for continuous rotation on a shaft 47, the latter being driven, through a suitable worm-and-gear arrangement 48, from a shaft 49 connected suitably by a chain drive 49′ to a prime mover, as a motor 50, which may be electrically controlled in the usual manner by a switch 51 disposed in any suitable position on the machine (Figure 6).

The face cam groove 45 is formed with a rising portion for advancing the plunger C on the ways 32 towards the knife or slicing mechanism D, and a falling portion for retracting the plunger C from the knife mechanism. On the advancing movement of the plunger C, the comb portion 37 thereof slidingly engages the bottom edge of each of the chute walls 28 for lifting or tilting the chute B in upward rotatory movement on the shaft 29 until, the plunger C being fully advanced, the chute B is in its loaf-receptive position (Figure 4). As the plunger C is retracted, the comb member 37 is withdrawn from under the chute B, permitting the latter to drop by gravity until the lower rear corners thereof rest upon the feed-plate 8, the angle members 30 of the chute B then being in their approximately vertical position, whereby a loaf of bread G contained in the chute B may freely slide off the floor angles 30 onto the feed plate 8.

During its reciprocations, the plunger C advances and recedes with respect to the knife mechanism D, which includes cutting means comprising a pair of groups or banks of oppositely reciprocating knives 52, 53, spaced apart conformably to the thickness of the slices to be formed, as presently more fully described, but I may here point out that, on advance of the plunger C, the loaf of bread G deposited therebefore, that is to say, into the space between the retracted plunger and the knives 52, 53, will be sidewise engaged by the fingers 38, 38′ and thereby slicingly fed through the banks of knives 52, 53, until, near the termination of the advancing movement of the plunger C, the fingers 38 of the feeding comb 37 and the fingers 38′ of the plate 36 each pass between respective pairs of the knives 52, 53, the latter then reciprocating in the slots formed by the respective pairs of the fingers 38 and 38′ (Figure 4), the latter, of course, pushing or feeding the slices past the knives for completion of the slicing operation.

As each loaf of bread G is discharged from the conveyer A onto the discharge-plate 7, the feeding-chute B takes its loaf-receptive position, that is, with its angle-members 30 in obliquely disposed or loaf-supporting position relatively to the plate 7, and the succeeding loaf G moving onto the plate 7 will engage the next loaf in advance and push the latter over the elevated portion 23 of the plate 7 and into the loaf-pocket of the chute B between the walls 28 thereof, the loaf thus deposited into the chute B then tilting over the edge of the plate 7 and sliding down the floor-angles 30 in tilted position relatively to the plates 7 and 8.

The freshly baked bread-loaves G are soft and warm, and to permit the same to fall without interference through the chute B and into the path of the feeding-plunger C, which at this moment is in its advanced position (Figure 4), would result in injury to the loaf. This I avoid by providing a pair of resilient members or yieldably retarding fingers 54 fixed at their upper ends on a transverse frame 55 pivotally supported from brackets 56, 56′, mounted on the upper end of one of the guide frames 61 of the knife or slicing mechanism, presently described, the frame 55 carrying at one end an arm 57 to which is threaded a thumb-screw 58 working in an arcuate slot 59 provided in the adjacent bracket 56 for adjustably clamping the frame 55 for presenting the free lower ends of its carried resiliently yieldable fingers 54 at a suitable inclination with respect to the floor angles 30 for the purpose of retardingly obstructing or catching therebetween the particular loaf of bread sliding down the floor-angles 30 and bringing the same gradually to rest within the chute B, the latter, during this operation, being in the loaf-receptive pause of its oscillatory feeding cycle. It may be here stated that such pause is defined by the period of the reciprocation of the plunger C when the chute B is resting upon the upper flat surface of the comb-member 37, as clearly shown in Figure 4.

It will now be readily seen that, as the plunger C is retracted from its advanced position, the chute B will, as the comb-member 37 recedes thereunder, begin to drop in tilting movement towards the feed plate 8. The particular bread-loaf G contained in the chute B thereby moves out of engagement by the fingers 34 and gradually, under the pull of gravity, begins to move downwardly along the floor-angles 30 as the latter assume a more and more vertical position, until finally the loaf, being now turned right-angularly to the position which it had while on the conveyer-discharge plate 7, rests on the feed-plate 8 in so-called slicing position or, more exactly, in the path of travel of the plunger C, Figure 5, for engagement thereby on advancing movement thereof, which, by suitably proportioning the several coacting parts, now occurs, whereby the particular loaf is advanced towards, and for slicing engagement by, the knife mechanism D, the chute B being returned to its loaf-receptive position in preparation for another feeding cycle, as described. I may here state that the successive loaves G are preferably fed through the slicing mechanism D in upright position, the loaves G being successively deposited to rest sidewise on the conveyer A and the approximately quarter-turn of the feeding-chute B serving to bring the loaves G in proper disposition on the feed-plate 8, as described. To assist the entry of each loaf into the chute B, the walls 28 thereof are each preferably provided with forwardly extending arcuate wing portions 60, which, when the chute B is in its loaf-receptive position, stand somewhat over the guide plates 25 on the conveyer-discharge plate 7, as seen in Figure 4.

Suitably supported by and between the horizontal members 5 of the main frame of the machine, is a pair of transversely spaced vertically disposed parallel knife-frame guides 61, 61, each having a pair of longitudinal guideways 62, 62, slidably engaged by a pair of reciprocating knife-frames 63, 64, each frame carrying a plurality of the laterally spaced vertical slicing knives 52, 53, Figure 8.

One knife-frame, as 63, reciprocates in the rearward one of the guideways 62, and on the front side of its upper transverse member 65 carries a plurality of lugs 66, each having a suitable groove for the reception of a pin 67 fixed in the upper end of each knife 52 carried by the frame 63, the lower end of each knife carrying a pin 68 engaging a hook-bolt 69 having its shank passed through a lug 70 disposed on the front side of the lower transverse member 71 of the frame 63 for tensionally adjusting the knife-blade 52, which latter, I may state, is preferably provided with a forward cutting edge having a wave-like outline, as is customary in bread slicing knives.

The other knife-frame 64, which carries the knives 53, is similarly constructed, except that the knives 53 are supported from the rear side of the respective upper and lower transverse members 65', 71', of the frame 64 in transverse alternate alignment with the other knives 52, each pair of oppositely reciprocating knives 52, 53, being interfittingly spaced apart in a common plane a distance equal to the thickness of the slice to be cut.

The knives 53 also each have a wave-like forward cutting edge and are actuated in cutting relation with the loaf of bread, as the latter is fed through the knives, by the reciprocatory motion of the frame 64, the latter moving upwardly, for example, while the frame 63 and its carried knives 52 move downwardly, each pair of knives 52, 53, cutting a slice of bread therebetween, from which it will be readily understood that the slices so cut are more or less free from the displacing effect of the slicing operation, one side of each slice being subject to a downward trend, while the other side of each slice is subject to an upward trend, neutralizing the first trend.

However, as a precaution against displacement of the slices, I provide stripping means, which includes a comb-like member 72 having a plurality of resilient or yieldable stripping fingers 73 each extending forwardly through and between the respective pairs of knives 52, 53, and over the feed plate 8, the free ends of the fingers 73 being thus disposed on the forward side of the knife mechanism D in the path of an advancing loaf of bread for yielding engagement with the upper side thereof, the comb-frame 72 being resiliently supported for this purpose from rods 74 each slidingly mounted through a pair of vertically aligned lugs 75, 76, on suitable bracket members 77, 77, upstanding from each side of the delivery table E, the rods 74 each carrying an adjustable spring-block 78 for engaging the lower end of a tensional member 79, whose upper end abuts the upper lug 75 on the bracket member 77, the spring block 78 impinging the lower lug 76 for limiting the downward movement thereof.

Preferably the rear edge of the comb-frame 72 is curved upwardly, as shown in Figure 4, to facilitate the free exit of the sliced loaf of bread thereunder. Co-operating with the stripping fingers 73 is a like plurality of grid members 73' formed in the feed plate 8, each pair of grid members 73' forming therebetween a slot, as 72', through which work the knives 52 or 53, as the case may be (Figure 8). Thus the loaf, while being sliced, is grippingly engaged between the yieldable fingers 73 and the fixed grids 73'.

To laterally retain the sliced loaf of bread in its pre-sliced shape and contour as it leaves the slicing knives, a pair of upstanding retaining walls 80 is adjustably mounted on the delivery table E, as by screws 81 threaded thereinto, the screws 81 passing through slots 82 provided in foot-members 83 forming a part of each wall 80 (Figure 1). The walls 80 are preferably each provided with forwardly extending arcuate resilient wings 84 (Figures 6 and 8) for yieldingly engaging the opposite ends of the loaf of bread, whereby the latter, as it emerges from the slicing mechanism D, is restored to its pre-sliced endwise dimensions from which, of course, the loaf has been expanded while passing the knives 52, 53. I prefer to construct the walls 80 of less height than the loaf of bread, in order that the upper portion thereof may be exposed for placing thereover a suitable container or tray, which may conveniently take the form described in a co-pending application, Serial No. 317,390, filed November 5, 1928.

For reciprocating the frames 63, 64, I provide a mechanism which preferably comprises a pair of cylinders 85, 85, each vertically positioned medially beneath one of the frames 63, 64. In each cylinder 85, is a reciprocatory piston 86, to which is attached a piston rod 87 slidably passing through a suitable stuffing box 88 and pivotally connected at its upper end, as at 89, to the frame 63 or 64, as the case may be. Each piston 86 has a wrist pin 90, on which is pivotally mounted one end of a connecting rod 91 pivoted at its other end on a crank-pin 92 forming a part of a two-throw crank shaft 93, in a manner well known to those skilled in the art. The throws of the crank-shaft 93 are 180 degrees apart; hence, on rotation of the crank-shaft, the pistons 86 are reciprocated in alternate directions. The cylinders 85 are preferably integrally united with the crank-case 4, the crank-shaft 93 revolving in suitable bearings 94 carried by the crank-case. At one or the rear end of the crankcase 4, a cap 95 forms an oil-tight closure over the bearing 94, while at the other end, through which the crank-shaft 93 is extended for operative connection with the shaft 49, an oil-proof ring or like closure 96 is provided, whereby the moving parts within the crank-case 4 are efficiently lubricated by an oil-splash, as customary in such constructions, but escape of the oil from the crank case 4 is effectually prevented, thereby preventing the accidental contamination of the bread with oil which might otherwise be thrown about the machine by the rapidly moving parts. The operative connection between the crank shaft 93 and the drive-shaft 49 may be conveniently effected by a coupling 97, as best seen in Figure 6.

However, stuffing boxes, even under the best conditions, are apt to leak small amounts of oil, which might be thrown upon the bread passing through the machine. To obviate even such possibility, the piston and cylinder arrangement described is provided, which operates in the following manner:

Each piston 86 is provided with a plurality of oil rings 98, which, in the manner well known to the art, normally act to return most of the oil thrown on the cylinder walls to the crank-case 4. Some oil will, of course, escape into the space between the piston 86 and the stuffing box 88 on down stroke of the piston 86 due to the suction effect thereof, this suction effect, however, having the beneficial result of drawing back into the cylinder 85 any oil that may adhere on the piston rod 87, as will be readily understood, and thus the projected part of the piston rod 86 is practically dry, and oil does not accumulate around the outside of the stuffing box. On up-stroke of the piston 86 the oily contents of the cylinder 85 thus trapped therein are discharged through a suitable check valve 99 and pipe 100 to the crank-case or enclosure 4, as shown in Figure 8.

The cam-shaft 47, I may here state, is suitably journaled at one end in the bearing bracket 42 intermediately mounted on the oil-pan 3, and at its other end in a bearing 102 mounted on one of the lower side members 103 of the main frame of the machine, Figure 8. Near the bearing 102, the shaft 47 carries a sprocket-wheel 104 having driving connection by means of a chain 105 with a sprocket wheel 106 fixed on the head-shaft 15 of the conveyer A. By such means, the several co-acting moving parts of the machine are operated in proper sequence suitably for the purpose intended.

Some débris is naturally formed by the slicing operation, which, when slicing bread, forms so called crumbs, and these latter, if recovered, have an economic value. I, therefore, provide beneath the knives 52, 53, suitable crumb-containers or receptacles 107 removably resting upon transverse supporting members 108 of the main frame of the machine in crumb-receptive position directly below the knife frames 63, 64. Preferably there are two of the containers 107, one on each side of the piston rods 87, and in actual practice I have found that such containers, so positioned, will catch most, if not all, of the crumbs resulting from the slicing operations, so that, at the end of a day's run, a considerable quantity of crumbs is recovered, which have a salable value contributing to the economy of the operation of the machine.

The instrumentalities of the several parts of the device having been set forth as the description proceeded, the manner in which the machine is intended to be used will be readily understood, but I may here briefly again point out some of the benefits to be obtained by my invention, namely, By providing the conveyer A suitably for the reception thereupon of a plurality of loaves of bread, the contents of a tray containing the baked bread may be accommodated on the conveyer at one time, thus releasing both the tray for further use and the operator for other duties.

The manner in which the bread is fed to the plunger C in preparation for the slicing operation effectually prevents accidental injury to the loaves, which are deposited in good condition, at the proper time, successively before the plunger.

The manner in which the oil for lubricating the knife operating mechanism is caught and returned to the crank case thereof prevents the accidental contamination of the bread passing through the machine, since the slightest drop of oil on the bread would destroy the salable value thereof.

The highly efficient manner in which the loaves of bread, both during and after the slicing operation, are retained in their pre-sliced shape and contour, and also the means whereby the slices are firmly pressed together after the slicing operation to prevent the access of air thereinbetween, preserves the freshness and purity of the bread.

The manner in which the entire operation of feeding and slicing the bread is effectuated without the intervention of human means, prevents contamination of the bread and promotes the hygiene of the operation.

It will be understood that while I have herein shown and described the preferred embodiment of my invention, changes and modifications in the form, construction, arrangement, and combination of the several parts thereof may be made and substituted for those herein shown and described without departing from the nature and principle of my invention.

Having thus described my invention, what I claim and desire to secure by Letters Patent is:

1. In an automatic bread-loaf slicing machine, in combination, a stationary feed-plate, and means for successively delivering the loaves one by one to and upon the feed-plate from a plane thereabove, said means including an oscillatory member, rails on said member for supporting the loaf deposited therein, and yielding fingers for engaging the loaf for retaining the same upon the rails when the oscillatory member is in loaf-receiving position.

2. An automatic bread-loaf slicing machine comprising, in combination, a frame, slicing mechanism mounted on the frame, and means for successively feeding the loaves for slicing through the slicing mechanism, said feeding means comprising a traveling conveyer, a stationary feed-plate, an oscillatory member and yielding fingers co-operating therewith in the path of the advancing loaves for successively delivering the loaves one by one from the conveyer to and upon the feed-plate, and a reciprocatory plunger for actuating the oscillatory member and shifting the loaves through the slicing mechanism.

3. An automatic bread-loaf slicing machine comprising, in combination, a frame, slicing mechanism mounted on the frame, and means for successively feeding the loaves for slicing through the slicing mechanism, said feeding means comprising a traveling conveyer, a stationary feed-plate disposed in a plane below the plane of the conveyer, an oscillatory member and yielding fingers co-operating therewith in the path of the advancing loaves for successively delivering the loaves one by one from the conveyer to the feed-plate, and a reciprocatory plunger for actuating the oscillatory member and shifting the loaves through the slicing mechanism.

4. An automatic bread-loaf slicing machine comprising, in combination, a frame, slicing mechanism mounted on the frame, and means for successively feeding the loaves through the slicing mechanism, said means including a stationary feed-plate, a discharge-plate located in a plane above the plane of the feed-plate, a traveling conveyer for transporting the loaves in succession to and upon the discharge-plate, an oscillatory member and yielding fingers co-operating therewith in the path of the advancing loaves for successively delivering the loaves one by one from the discharge-plate to and upon the feed-plate, and a plunger reciprocatory over the feed-plate for both actuating the oscillatory member and shifting the loaves to and through the slicing mechanism.

5. An automatic bread-slicing machine comprising, in combination, a frame, slicing mechanism mounted on the frame, a stationary feed-plate, a stationary discharge-plate located in a plane above the plane of the feed-plate, a conveyer for transporting the loaves in succession to and upon the discharge-plate, an oscillatory member and yielding fingers co-operating therewith in the path of the advancing loaves for successively delivering the loaves one by one from the discharge-plate to the feed-plate, a plunger reciprocatory over the feed-plate for both actuating the oscillatory member and shifting the loaves to and through the slicing mechanism, and means for synchronously actuating the plunger and the slicing mechanism.

6. An automatic bread loaf slicing machine comprising, in combination, a frame, slicing mechanism mounted on the frame, and means for successively feeding the loaves for slicing to the slicing mechanism, said feeding means including a stationary discharge-plate, a conveyer for transporting the loaves to the discharge-plate, an oscillatory member and yielding fingers co-operating therewith in the path of the advancing loaves for successively receiving the loaves from the plate, and a frame on the discharge-plate for guiding the loaves successively into the oscillatory member.

7. A bread-loaf slicing machine comprising, in combination, a feed-table having a plurality of transversely aligned stripping grids forming slots therebetween, a plurality of spaced cutting members each working in one of said slots, means for feeding an article to be sliced over the feed-table for engagement by the cutting members, and yieldably supported stripping means including resilient members each presented between a pair of the cutting members and spacingly aligned with the stripping grids for passage of the article grippingly therebetween.

8. An automatic bread-loaf slicing machine including, in combination, a frame, a carrier mounted in forwardly presented relation to the frame, a feed-plate disposed at the rear end of and in a plane below the carrier, oscillatory means for successively transferring the articles from the discharge end of said carrier to the feed-plate, a plunger reciprocably movable over said feed plate, a plurality of oppositely reciprocating slicing knives, disposed in a plane across the path of said plunger, article feeding-fingers presented from the plunger for movement between each pair of knives, a plurality of stripping means disposed between each pair of knives, some of said stripping means being fixed and others being yieldable, a delivery table aligned with the feed-plate and rearwardly disposed from the slicing knives, and means on the delivery table for engaging the opposite ends of the sliced loaf for restoring the loaf to its pre-sliced endwise dimensions.

9. A bread loaf slicing machine comprising, in combination, a discharge plate, a feed table, means for successively delivering the loaves in sidewise position upon the discharge plate, and means for successively depositing the loaves from the discharge plate and in upright position upon the feed table.

In testimony whereof, I have signed my name to this specification.

ANTHONY TEWES.